United States Patent
Zheng et al.

(10) Patent No.: US 11,741,361 B2
(45) Date of Patent: Aug. 29, 2023

(54) MACHINE LEARNING-BASED NETWORK MODEL BUILDING METHOD AND APPARATUS

(71) Applicant: TENCENT TECHNOLOGY (SHENZHEN) COMPANY LIMITED, Shenzhen (CN)

(72) Inventors: Bo Zheng, Shenzhen (CN); Zhibin Liu, Shenzhen (CN); Rijia Liu, Shenzhen (CN); Qian Chen, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 1183 days.

(21) Appl. No.: 15/984,754

(22) Filed: May 21, 2018

(65) Prior Publication Data

US 2018/0268296 A1    Sep. 20, 2018

Related U.S. Application Data

(63) Continuation of application No. PCT/CN2017/086917, filed on Jun. 2, 2017.

(30) Foreign Application Priority Data

Jun. 2, 2016    (CN) .......................... 201610389530.9

(51) Int. Cl.
*G06N 3/082*    (2023.01)
*G06N 3/044*    (2023.01)
(Continued)

(52) U.S. Cl.
CPC ............. *G06N 3/082* (2013.01); *G06N 3/044* (2023.01); *G06N 3/045* (2023.01); *G06N 3/047* (2023.01);
(Continued)

(58) Field of Classification Search
CPC ........ G06N 3/082; G06N 3/044; G06N 3/045; G06N 3/047; G06N 5/01; G06N 7/01;
(Continued)

(56) References Cited

U.S. PATENT DOCUMENTS

| | | |
|---|---|---|
| 6,119,112 A | 9/2000 | Bush |
| 2008/0281767 A1 | 11/2008 | Garner |
| 2015/0193694 A1 | 7/2015 | Vasseur et al. |

FOREIGN PATENT DOCUMENTS

| | | |
|---|---|---|
| CN | 101814160 | 8/2010 |
| CN | 103345656 | 10/2013 |

(Continued)

OTHER PUBLICATIONS

Caruana, Model Compression, in Proceedings of the 12th ACM SIGKDD international conference on Knowledge discovery and Data Mining, ACM, 2006 (Year: 2006).*

(Continued)

*Primary Examiner* — Kakali Chaki
*Assistant Examiner* — Shien Ming Chou
(74) *Attorney, Agent, or Firm* — ARENTFOX SCHIFF LLP

(57) ABSTRACT

A method and an apparatus to build a machine learning based network model are described. For example, processing circuitry of an information processing apparatus obtains a data processing procedure of a first network model and a reference dataset that is generated by the first network model in the data processing procedure. The data processing procedure includes a first data processing step. Further, the processing circuitry builds a first sub-network in a second network model of a neural network type. The second network model is the machine learning based network model to be built. The first sub-network performs the first data processing step. Then, the processing circuitry performs opti- (Continued)

mization training on the first sub-network by using the reference dataset.

20 Claims, 7 Drawing Sheets

(51) Int. Cl.
G06N 3/045 (2023.01)
G06N 3/047 (2023.01)
G06N 20/10 (2019.01)
G06N 20/20 (2019.01)
G06N 5/01 (2023.01)
G06N 7/01 (2023.01)
H04L 41/16 (2022.01)
H04L 41/14 (2022.01)
G06F 18/23 (2023.01)
G06F 18/214 (2023.01)
H04L 41/12 (2022.01)

(52) U.S. Cl.
CPC ............ *H04L 41/145* (2013.01); *H04L 41/16* (2013.01); *G06F 18/214* (2023.01); *G06F 18/23* (2023.01); *G06N 5/01* (2023.01); *G06N 7/01* (2023.01); *G06N 20/10* (2019.01); *G06N 20/20* (2019.01); *H04L 41/12* (2013.01)

(58) Field of Classification Search
CPC ........ G06N 20/10; G06N 20/20; G06N 20/00; G06N 3/08; H04L 41/145; H04L 41/16; H04L 41/12; G06F 18/214; G06F 18/23; G06F 18/2414
See application file for complete search history.

(56) References Cited

FOREIGN PATENT DOCUMENTS

| CN | 103729459 | | 4/2014 | |
|---|---|---|---|---|
| CN | 103838836 | | 6/2014 | |
| CN | 104751227 | | 7/2015 | |
| CN | 106096727 | | 11/2016 | |
| EP | 2533176 | | 12/2012 | |
| JP | H05128082 | * | 7/1991 | ............ G06N 99/00 |

OTHER PUBLICATIONS

Berniker, Deep networks for Motor Control Functions, Frontiers in Computational Neuroscience, vol. 9, 2015 (Year: 2015).*
Makhzani, Adversarial Autoencoders, arXiv, May 2016 (Year: 2016).*
Bengio, Greedy layer-wise training of deep networks, Advanced in Neural Information Processing System, 2007 (Year: 2007).*
Wright, Neural Network Architecture Selection Analysis with Application to Cryptography Location, WCCI 2010 (Year: 2010).*
Hong, Multimodal Deep Autoencoder for Human Pose Recovery, IEEE Translations on Image Processing vol. 24, 2015 (Year: 2015).*
Chollet, Building Autoencoders in Keras, blog.keras.io, May 2016 (Year: 2016).*
Montanez, Unveiling the Hidden layers of Deep learning, Scientific American, May 2016 (Year: 2016).*
Translation of JPH05128082A Data Processor Constituting Hierarchical Network and it's Learning Processing Method. (Year: 1991).*
Ishamael, python—Choosing from different cost function and activation function of a neural network, Stack Overflow, Dec. 2015 (Year: 2015).*
International Search Report dated Sep. 6, 2017 in PCT/CN2017/086917 filed Jun. 2, 2017. (With English Translation).
Office Action dated Feb. 24, 2018 in Chinese Patent Application No. 201610389530.9 (With Concise English Translation).
Extended European Search Report Issued in Application dated Feb. 18, 2019, (9 pages).
Korean Office Action Issued in Application KR10-2018-7013732 dated Feb. 6, 2020, with English Translation (10 pages).
Jeffrey Dean et al., "Large Scale Distributed Deep Networks", Nov. 13, 2012 (11 pages).
Samsung SDS Communication Team, "The Machine Learning (3 piece)", Source aiming at the analysis section of [it more approaches to IT with step] SMAC, and the intellectualization: https://www samsungsds.com /global /ko /news/story/12032412919 html, . Aug. 12, 2015 (7 pages).
Samsung SDS Communication Team, "The Machine Learning (1 piece)", Source aiming at the analysis section of [it more approaches to IT with step] SMAC, and the intellectualization: https://www samsungsds.com./global/ko/news/story /12032502919 html, May 19, 2015 (7 pages).
For the Interesting Life, Convolution neural network (Convolutional Neural Network: CNN), https://address83 tistory.com./164., May 13, 2016 (4 pages).

* cited by examiner

MACHINE LEARNING-BASED NETWORK MODEL BUILDING METHOD AND APPARATUS

RELATED APPLICATION

This application is a continuation of International Application No. PCT/CN2017/086917, filed on Jun. 2, 2017, which claims priority to Chinese Patent Application No. 201610389530.9, entitled "MACHINE LEARNING-BASED NETWORK MODEL BUILDING METHOD AND APPARATUS" filed on Jun. 2, 2016. The entire disclosures of the prior applications are hereby incorporated by reference in their entirety.

FIELD OF THE TECHNOLOGY

This application relates to the field of Internet technologies, and in particular, to a machine learning-based network model building method and apparatus.

BACKGROUND OF THE DISCLOSURE

With rapid development of machine learning technologies, machine learning methods start to be used for building network models in more fields, and built network models are used as a tool of analyzing, controlling, and determining. The network model includes: a non-neural network (NN) model and an NN model. An NN is a complex network system formed by a large number of processing units (referred to as neurons) connected to each other, and is a high-complexity non-linear dynamic learning system. The basis of the NN is the neurons, and the NN model is indicated by using a network topology, a node feature, and a learning rule of the neurons.

SUMMARY

Embodiments of this application provide a machine learning-based network model building method and apparatus, to simplify a process of building a network model, and improve the model building efficiency.

A method and an apparatus to build a machine learning based network model are described. For example, processing circuitry of an information processing apparatus obtains a data processing procedure of a first network model and a reference dataset that is generated by the first network model in the data processing procedure. The data processing procedure includes a first data processing step. Further, the processing circuitry builds a first sub-network in a second network model of a neural network type. The second network model is the machine learning based network model to be built. The first sub-network performs the first data processing step. Then, the processing circuitry performs optimization training on the first sub-network by using the reference dataset.

In an example, the data processing procedure includes the first data processing step and a second data processing step that follows the first data processing step. The processing circuitry then builds a second sub-network in the second network model to perform the second data processing step. Further, the processing circuitry performs optimization training on the second sub-network by using the reference dataset. Then, the processing circuitry merges the first sub-network with the second sub-network into the second network model.

In some embodiments, first input and output data for the first data processing step is extracted and second input and output data for the second data processing step is also extracted. The first input and output data and the second input and output data are included in the reference data set.

To build the first sub-network and the second sub-network in the second network model, the processing circuitry searches a preset equivalent correspondence table for a first main network structure of the first sub-network that performs the first data processing step. The present equivalent correspondence table associates main network structure types with data processing types. The processing circuitry further determines, according to the first input and output data corresponding to the first data processing step, a first input layer structure and a first output layer structure of the first sub-network that performs the first data processing step. Then the processing circuitry builds the first sub-network, according to the first main network structure, the first input layer structure, and the first output layer structure. Similarly, the processing circuitry searches the preset equivalent correspondence table for a second main network structure of the second sub-network that performs the second data processing step. Then, the processing circuitry determine, according to the second input and output data corresponding to the second data processing step, a second input layer structure and a second output layer structure of the second sub-network that performs the second data processing step. Further, the processing circuitry builds the second sub-network, according to the second main network structure, the second input layer structure, and the second output layer structure.

In some embodiments, the processing circuitry reads, from the reference dataset, the first input and output data corresponding to the first data processing step. Then, the processing circuitry performs optimization adjustment on a parameter of the first sub-network for performing the first data processing step based on the first input and output data and according to a neural network (NN) training optimization algorithm. The parameter can include at least one of a network node, a weight, and a training rate.

In an embodiment, the processing circuitry selects one of the first sub-network and the second sub-network as a seed network, and the other one of the first sub-network and the second sub-network as a to-be-merged network. Then, the processing circuitry removes the second input layer structure and the first output layer structure between the seed network and the to-be-merged network, and merges the seed network with the to-be-merged network to form a grown seed network. In an example, when the merging of the grown seed network succeeds, the processing circuitry performs optimization adjustment on a parameter of the grown seed network based on the first input and output data and the second input and output data. In another example, the processing circuitry adds an intermediate hidden layer structure between the seed network and the to-be-merged network when the merging fails and merges the seed network and the to-be-merged network using the intermediate hidden layer.

Aspects of the disclosure also provide a non-transitory computer-readable medium storing instructions which when executed by a computer cause the computer to perform the method to build a machine learning based network model.

In the embodiments of this application, a data processing procedure of an original network model is analyzed, actual operating data generated by the original network model in the data processing procedure is used as a reference dataset, at least one equivalent sub-network is hierarchically built, optimization training is performed on the at least one sub-network, and a target network model is finally formed by means of merging. Layers of the target network model are flexibly and quickly built by using the actual operating data of the original network model and then are merged to form the target network model, and there is no need to design an entire structure of the target network model from the very beginning. Therefore, a model building process is simplified, and the model building efficiency is effectively improved. Optimization adjustment on the target network model is performed in a divided manner, optimization adjustment is first performed on each sub-network, and then the at least one sub-network is merged, so that an optimization adjustment process of the target network model is more flexible, and the model building efficiency is further improved.

BRIEF DESCRIPTION OF THE DRAWINGS

To describe the technical solutions in the embodiments of this application, the following briefly describes the accompanying drawings required for describing the embodiments. The accompanying drawings in the following description show merely some embodiments of this application, and a person of ordinary skill in the art may still derive other drawings from these accompanying drawings.

DESCRIPTION OF EMBODIMENTS

Figure 1:
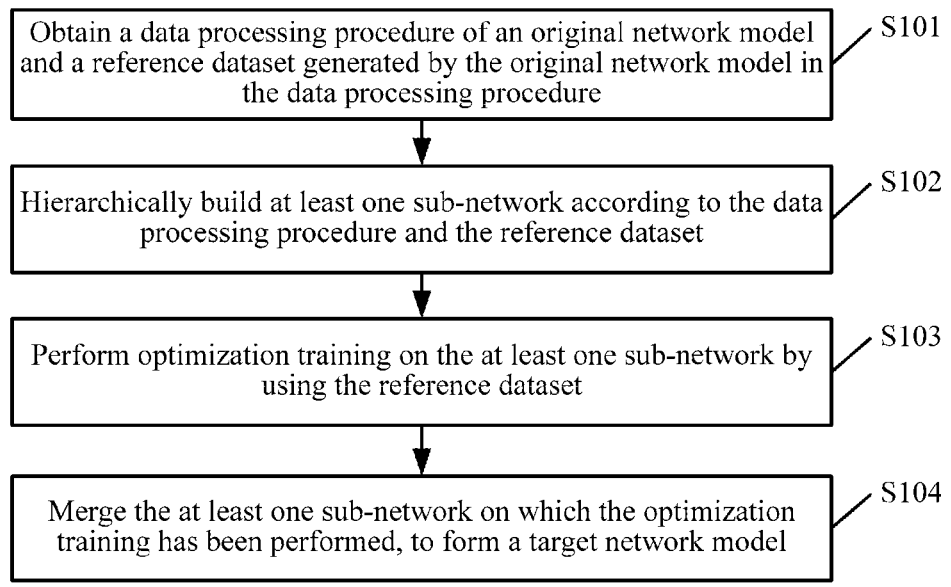
FIG. 1 is a flowchart of a machine learning-based network model building method according to an embodiment of this application.

The following describes the technical solutions in the embodiments of this application with reference to the accompanying drawings in the embodiments of this application. The described embodiments are some embodiments of this application rather than all of the embodiments. All other embodiments obtained by a person of ordinary skill in the art based on the embodiments of this application shall fall within the protection scope of this application.

In an embodiment of this application, in a process of performing machine learning on a network model to build an NN model, data of an existing network model needs to be labeled to form a training set, and then an NN model is built from the very beginning. In a process of training an NN, massive data needs to be manually labeled to generate labeled data used as the training set. The process requires massive human-machine interaction, and needs to consume a large number of device resources. In addition, building the NN model from the very beginning requires complex parameter adjustment on the entire built network model, leading to heavy workload and low model building efficiency.

The network model includes: a non-NN model and an NN model. An NN is a complex network system formed by a large number of processing units (referred to as neurons in the NN) connected to each other, and is a high-complexity non-linear dynamic learning system. The neurons are basic units forming the NN. The NN model is indicated by using a network topology, a node feature, and a learning rule of the neurons. Compared with the non-NN model, the NN model has a stronger deep learning capability and a better environmental adaptability.

The embodiments of this application provide a learning-based network model building method and apparatus, so that a data processing procedure of an original network model is analyzed, at least one equivalent sub-network is hierarchically built by using actual operating data generated by the original network model in the data processing procedure as a reference dataset, optimization training is performed on the at least one sub-network, and a target network model is finally formed by means of merging. The target network model is built by using the machine learning process, so that the following beneficial effects can be obtained:

(1) The performance reliability is high. The target network model is obtained by performing joint optimization adjustment on the at least one sub-network equivalent to the data processing procedure of the original network model. Therefore, compared with the original network model, for the target network model, problems of running-in and adaptation between data processing steps do not need to be considered any more. In addition, the joint optimization process is based on the actual operating data of the original network model, so that processing performance reliability of the target network model can be ensured.

(2) The adjustment flexibility is high. The target network model is driven to be changed by training the actual operating data of the original network model. Therefore, if the target network model needs to be adjusted, a parameter related to the training process needs to be adjusted without considering a problem of parameter adaptation between layered structures of the target network model, so that the adjustment flexibility is relatively high. In addition, if new operating data occurs or is generated in the original network model, the target network model can be directly adjusted by using the new operating data without excessive human interference, so that the manpower costs are reduced and the workload of model building is reduced.

(3) The building process is simple. The target network model does not need to be built by starting from the very beginning. Therefore, a complex network structure adjustment process is avoided. In addition, redundant human experience is not required as the reference, so that the model building time is greatly reduced, and the building efficiency is improved.

(4). The data is fully used. The target network model is a deep network formed by the at least one sub-network by means of joint optimization, so that the performance reliability is high. Compared with the original network model, parameters can be continuously iterated to make full use of values of the data, so as to implement better performance optimization.

(5) The target network model has interpretability. The target network model is formed by performing equivalent replacement on the original network model using a machine learning method. In the process, the actual operating data generated by the original network model in the data processing procedure is used, and no labeled data that is understood or perceived by human is added, so that interpretative factors of the original network model are inherited to some extent, and the target network model is more applicable to a scenario having a relatively high interpretability requirement.

It is noted that the original network model may be a non-NN model or an NN model, and the target network model may be an NN model. Unless particularly specified, in subsequent embodiments of this application, the original network model is described by using a non-NN model as an example, and the target network model is described by using an NN model as an example.

Based on the foregoing descriptions, an embodiment of this application discloses a machine learning-based network model building method. Referring to FIG. 1, the method may include the following step S101 to step S104:

S101: Obtain a data processing procedure of an original network model and a reference dataset generated by the original network model in the data processing procedure.

The original network model is used as a tool of analyzing, controlling, and determining, and performs a series of data processing steps in an operation process to form a complete data processing procedure. The data processing step herein may include, but is not limited to, at least one of the following:

(1). An undiversified machine learning step. The step is implemented based on a classification algorithm, a clustering algorithm, a component analysis algorithm, a dimension-reduction mapping algorithm, and an encoder method. The classification algorithm may include, but is not limited to, a Support Vector Machine (SVM), a decision tree, a threshold classifier, logistic regression, a shallow NN, a gradient boosting decision tree (GBDT), a method for boosting accuracy of a weak classification algorithm, a k-nearest neighbor (KNN), a Bayes classifier, a random forest method, and other possible variant methods. The clustering algorithm may include, but is not limited to, a division-based clustering method (k-means), a k-center, MeanShift, spectral clustering, a Density-Based Spatial Clustering of Applications with Noise (DBSCAN) algorithm, and an affinity propagation method. The component analysis algorithm may include, but is not limited to, principal component analysis (PCA), canonical correspondence analysis (CCA), factor analysis, Fourier transform, and wavelet analysis. The dimension-reduction mapping algorithm may include, but is not limited to, mixture discriminant analysis (MDA), Fisher projection, and lsoMap (a global optimization algorithm). The encoder method may include, but is not limited to, linear discriminant analysis (LDA), probabilistic latent semantic analysis (PLSA), latent semantic analysis (LSA), and sparse coding.

(2). A data statistics step. The step may be implemented based on a data statistics algorithm, and the data statistics algorithm may include, but is not limited to, summation, averaging, quantile evaluation, extreme value evaluation, central statistical moment evaluation, chi-squared statistics evaluation, and the like.

(3). A sequence analysis step. The step may be implemented based on a sequence analysis algorithm, and the sequence analysis algorithm may include, but is not limited to, autoregressive integrated moving average model (ARIMA) regression, Karman filtering, and the like.

(4). A function processing step. A function herein may include, but is not limited to, a linear mapping function, an information entropy-included transformation function, an analytic function, a transcendental function, and the like.

(5). A data editing processing step. The step may include, but is not limited to, data merging, data screening, data splitting, data transformation, and the like.

In step S101, at least one data processing step in the data processing procedure operated by the original network model may be analyzed and recorded. In addition, the original network model generates operating data when performing each data processing step. The operating data herein may include, but is not limited to, input data and intermediate data that are used and output data that is obtained by the original network model in an actual operation process; or input data, intermediate data, and output data that are labeled and used by the original network model in a training or test process; or analog input data and intermediate data that are manually injected for the original network model and obtained output data. In the step, some or all operating data is extracted from the operating data of each data processing step as the reference dataset.

S102: Hierarchically build at least one sub-network according to the data processing procedure and the reference dataset.

The data processing procedure records at least one data processing step performed by the original network model, and the reference dataset includes at least one group of input/output data corresponding to each data processing step. The idea of hierarchical building is: each data processing step of the original network model may be performed by a sub-network having an equivalent function, and therefore, one data processing step may correspond to a network main structure of one sub-network; in addition, an input/output layer of the sub-network may be determined by input/output data of the data processing step. Therefore, in the step, the at least one sub-network may be hierarchically built according to the data processing procedure of the original network model and the extracted reference dataset. For example, assuming that the data processing procedure of the original network model is represented by four data processing steps in total: "step a1→step a2→step a3→step a4", step a1 is equivalent to a sub-network b1 at a first layer, a main structure of the sub-network b1 is determined by step a1, and an input layer and an output layer of the sub-network b1 is determined by input/output data extracted from step a1; similarly, step a2 is equivalent to a sub-network b2 at a second layer, a main structure of the sub-network b2 is determined by step a2, and an input layer and an output layer of the sub-network b2 is determined by input/output data extracted from step a2. By analogy, step a4 is equivalent to a sub-network b4 at a fourth layer, a main structure of the sub-network b4 is determined by step a4, and an input layer and an output layer of the sub-network b4 is determined by input/output data extracted from step a4. It can be further learned according to the example that the target network model is formed by the sub-network b1, the sub-network b2, a sub-network b3, and the sub-network b4 by means of layered connection.

S103: Perform optimization training on the at least one sub-network by using the reference dataset.

An objective of optimization training is to: continuously adjust a parameter of the at least one sub-network with reference to data in the reference dataset, so that a performance indicator of the sub-network reaches a same or even higher level of a performance indicator of a corresponding data processing step in the original network model. The parameter of the sub-network herein may include: at least one of a network node, a weight, and a training rate. During one implementation, at least one group of input/output data extracted from each data processing step is used for performing optimization training on a sub-network equivalent to the data processing step. According to the example in step S102, at least one group of input/output data corresponding to step a1 in the reference dataset is used for performing optimization training on the sub-network b1, and at least one group of input/output data corresponding to step a2 is used for performing optimization training on the sub-network b2. By analogy, at least one group of input/output data corresponding to step a4 is used for performing optimization training on the sub-network b4.

S104: Merge the at least one sub-network on which the optimization training has been performed, to form a target network model.

In the step, the at least one sub-network on which the optimization training has been performed needs to be continuously iteratively merged. In the merging process, joint optimization further needs to be performed on a network formed by means of continuous merging, so that the complete target network model is finally formed. The target network model formed by using iterative merging and joint optimization processes is a deep network, and has relatively high performance reliability.

By means of the machine learning-based network model building method in this embodiment of this application, a data processing procedure of an original network model is analyzed, actual operating data generated by the original network model in the data processing procedure is used as a reference dataset, at least one equivalent sub-network is hierarchically built, optimization training is performed on the at least one sub-network, and a target network model is finally formed by means of merging. Layers of the target network model are flexibly and quickly built by using the actual operating data of the original network model and then are merged to form the target network model, and there is no need to design an entire structure of the target network model from the very beginning. Therefore, a model building process is simplified, and the model building efficiency is effectively improved. Optimization adjustment on the target network model is performed in a divided manner, optimization adjustment is first performed on each sub-network, and then the at least one sub-network is merged, so that an optimization adjustment process of the target network model is more flexible, and the model building efficiency is further improved.

Figure 2:
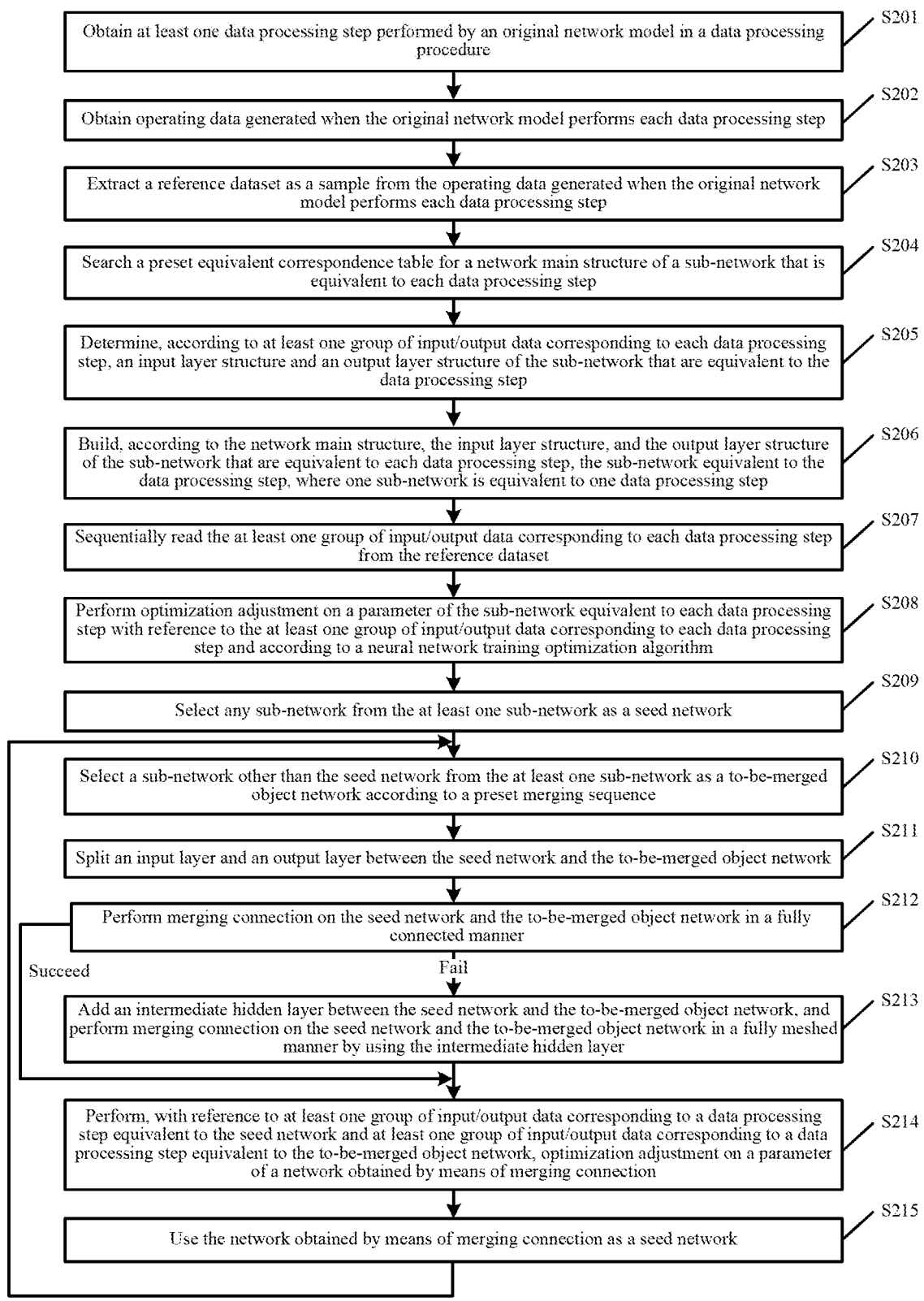
FIG. 2 is a flowchart of another machine learning-based network model building method according to an embodiment of this application.

An embodiment of this application discloses another machine learning-based network model building method. Referring to FIG. 2, the method may include the following step S201 to step S204:

S201: Obtain at least one data processing step performed by an original network model in a data processing procedure.

The original network model is used as a tool of analyzing, controlling, and determining, and performs a series of data processing steps in an operation process to form a complete data processing procedure. In the step, at least one data processing step performed in the data processing procedure operated by the original network model may be analyzed and recorded. For example, it is assumed that four steps in total that are "step a1→step a2→step a3→step a4" performed in the data processing procedure of the original network model are obtained.

In an embodiment of this application, to-be-processed data is referred to as original data. The original data is processed by using a series of data processing steps, that is, processed by using data processing steps in the original network model, to finally obtain an output result. Each data processing step is used for completing a particular processing function, for example, classifying the data or obtaining the data through statistics. The data processing steps form the data processing procedure. The data processing procedure may include: one or more data processing sub-procedures including a data processing step. A result obtained by using each data processing sub-procedure is referred to as an output sub-result. After output sub-results are obtained, the data sub-results are merged to obtain the output result. In the original network model, each data processing step is referred to as a network node, each data processing sub-procedure is referred to as a sub-path in the original network model, and each sub-path is a one-way path formed by sequentially connecting network nodes in series according to a performing sequence of the data processing steps. The original network model is a network model obtained by combining sub-paths.

Figure 2A:
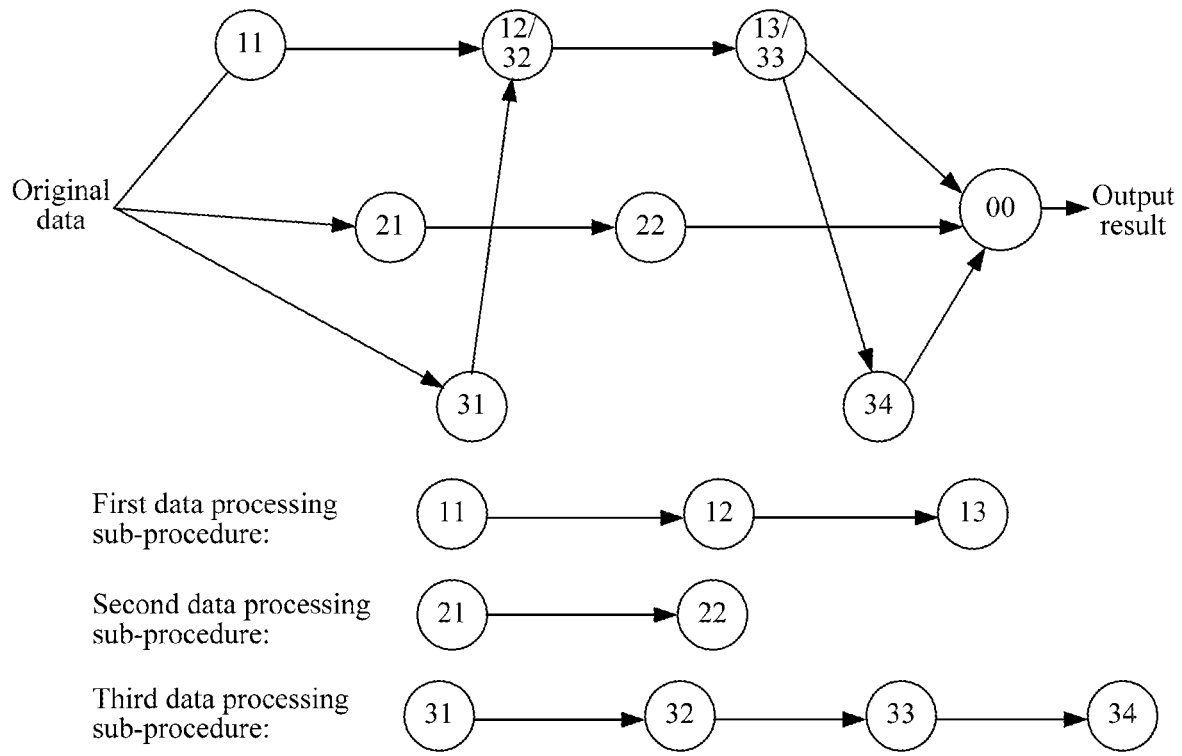
FIG. 2A is a schematic diagram of an original network model according to an embodiment of this application.

For example, a data processing procedure forming an original network model includes three data processing sub-procedures. A first data processing sub-procedure includes: a node 11 corresponding to a data classification processing step, a node 12 corresponding to a data statistical processing step, and a node 13 corresponding to a data regression processing step. A second data processing sub-procedure includes: a node 21 corresponding to a data clustering processing step and a node 22 corresponding to a data function mapping processing step. A third data processing sub-procedure includes: a node 31 corresponding to a data component analysis processing step, a node 32 corresponding to the data statistical processing step, that is, the node 12, a node 33 corresponding to the data regression processing step, that is, the node 13, and a node 34 corresponding to a data sequence analysis processing step. The original data is processed by using data processing steps in the first data processing sub-procedure, to obtain a first output sub-result. The original data is processed by using data processing steps in the second data processing sub-procedure, to obtain a second output sub-result. The original data is processed by using data processing steps in the third data processing sub-procedure, to obtain a third output sub-result. A data merging (corresponding to a node 00 in the original network model) step is performed on the obtained first output sub-result, second output sub-result, and third output sub-result, to obtain an output result. As shown in FIG. 2A, FIG. 2A is a schematic diagram of the original network model according to this embodiment of this application.

In step S201, the at least one data processing step, for example, the data classification processing step corresponding to the node 11 in FIG. 2A, in the data processing procedure forming the original network model may be obtained.

S202: Obtain operating data generated when the original network model performs each data processing step.

The original network model generates the operating data when performing each data processing step. The operating data herein may include, but is not limited to, input data and intermediate data that are used and output data that is obtained by the original network model in an actual operation process; or input data, intermediate data, and output data that are labeled and used by the original network model in a training or test process; or analog input data and intermediate data that are manually injected for the original network model and obtained output data. In the step, the operating data generated when the original network model performs each data processing step is obtained. According to the example described in S201, operating data generated when the original network model performs step a1, operating data generated when the original network model performs step a2, operating data generated when the original network model performs step a3, and operating data generated when the original network model performs step a4 need to be respectively obtained.

For example, in the step, the operating data generated when each data processing step is performed may be obtained, for example, operating data generated when the data classification processing step corresponding to the node 11 is performed.

S203: Extract a reference dataset as a sample from the operating data generated when the original network model performs each data processing step. For example, some or all data from the operating data generated when the original network model performs each data processing step, is extracted to form a reference dataset During one implementation, according to the example described in this embodiment, assuming that two groups of input/output data are generated in a process of performing step a1 by the original network model, in the step, one of the two groups of input/output data may be extracted as a sample to be added to the reference dataset, or the two groups of input/output data may be both extracted to be added to the reference dataset. By analogy, the reference dataset includes at least one group of input/output data corresponding to each data processing step.

Step S201 to step S203 in this embodiment may be specific detailed steps of step S101 shown in FIG. 1.

S204: Search a preset equivalent correspondence table for a network main structure of a sub-network that is equivalent to each data processing step.

As described above, the data processing step may include, but is not limited to, at least one of the following: (1). an undiversified machine learning step; (2). a data statistics step; (3). a sequence analysis step; (4). a function processing step; and (5). a data editing processing step. Each type of data processing step has an equivalent network main structure of a sub-network. For an equivalent relationship, refer to the following Table 1:

In the right column of Table 1, if a plurality of network main structures exists, it indicates that any network main structure or any combination of network main structures corresponds to a data processing step in the left column. For example, a network main structure equivalent to the data statistics step includes a pooling layer, a convolutional layer, and a fully connected layer. Therefore, any one of or a combination of the pooling layer, the convolutional layer, and the fully connected layer is equivalent to the data statistics step. During actual application, if one data processing step has a plurality of equivalent network main structures of a sub-network, a final network main structure of the sub-network may be determined by using a feedback of an actual training effect, for example, a network main structure whose error ratio is minimum is selected. It may be understood that Table 1 is not exhaustive, and another data processing step and an equivalent network main structure may be added to Table 1 if existing.

An equivalent network main structure corresponding to each data processing step is pre-stored in Table 1. For example, equivalent processing of the data classification processing step may be completed by using the network main structure of the fully connected layer and/or the Maxout layer. In an embodiment of this application, each network main structure may be a neural sub-network including at least one neuron. In an embodiment of this application, the neuron may be a narrow or generalized neuron. In the step, an equivalent network main structure of a sub-network is determined for each data processing step in the original network model according to the equivalent correspondence table.

S205: Determine, according to at least one group of input/output data corresponding to each data processing step, an input layer structure and an output layer structure of the sub-network that are equivalent to the data processing step.

In the step, the dimension of an equivalent input layer of the sub-network needs to be determined according to input data corresponding to each data processing step, and the dimension of an equivalent output layer of the sub-network needs to be determined according to output data corresponding to each data processing step. That is, the dimension of an input layer of a sub-network that is equivalent to a data processing step is the same as that of input data corresponding to the data processing step, and the dimension of an output layer of the sub-network that is equivalent to the data processing step is the same as that of output data corre-

TABLE 1

Preset equivalent correspondence table

| Data processing step | Equivalent network main structure |
| --- | --- |
| Undiversified machine learning (classification) | Fully connected layer and Maxout layer |
| Undiversified machine learning (clustering and component analysis) | Autoencoder and Restricted Boltzmann Machines (RBM) |
| Undiversified machine learning (encoder) | Autoencoder, embedding structure, and long-short term memory (LSTM) |
| Data statistics | Pooling layer, convolutional layer, and fully connected layer |
| Function processing (linear mapping function) | Multilayer perceptron |
| Sequence analysis | Recurrent NN (RNN), LSTM, and fully connected layer |
| Data editing processing (data merging and splitting) | Merge layer and split layer |
| . . . | . . . | sponding to the data processing step. The dimension herein may include a data source, the data amount, and the like.

S206: Build, according to the network main structure, the input layer structure, and the output layer structure of the sub-network that are equivalent to each data processing step, the sub-network equivalent to the data processing step, where one sub-network is equivalent to one data processing step.

In an embodiment of this application, one sub-network being equivalent to one data processing step means that with a same input, a processing result obtained by means of processing using the sub-network is the same as or similar to a processing result obtained by means of processing using the data processing step. Being similar means that a difference between the two processing results is less than a preset threshold.

In the step, the input layer structure and the output layer structure are added based on the network main structure of the sub-network, so as to form a network structure of the sub-network. Step S204 to step S206 in this embodiment may be specific detailed steps of step S102 shown in FIG. 1.

S207: Sequentially read the at least one group of input/output data corresponding to each data processing step from the reference dataset.

S208: Perform optimization adjustment on a parameter of the sub-network equivalent to each data processing step with reference to the at least one group of input/output data corresponding to each data processing step and according to an NN training optimization algorithm, where the parameter includes: at least one of a network node, a weight, and a training rate.

The NN training optimization algorithm may include, but is not limited to, at least one of the following: a stochastic gradient descent algorithm, RMSProp (an optimization algorithm), a momentum method, AdaGrad (an algorithm for allocating different learning rates to parameters), and AdaDelta (an optimization algorithm). In step S207 and S208, the at least one group of input/output data extracted from each data processing step is used for performing optimization training on the sub-network equivalent to the data processing step. According to the example described in this embodiment, at least one group of input/output data corresponding to step a1 is read from the reference dataset for performing optimization training on a sub-network b1 equivalent to step a1, and at least one group of input/output data corresponding to step a2 is read from the reference dataset for performing optimization training on a sub-network b2 equivalent to step a2. By analogy, at least one group of input/output data corresponding to step a4 is read from the reference dataset for performing optimization training on a sub-network b4 equivalent to step a4. Step S207 and step S208 in this embodiment may be specific detailed steps of step S103 shown in FIG. 1.

Figure 3A:
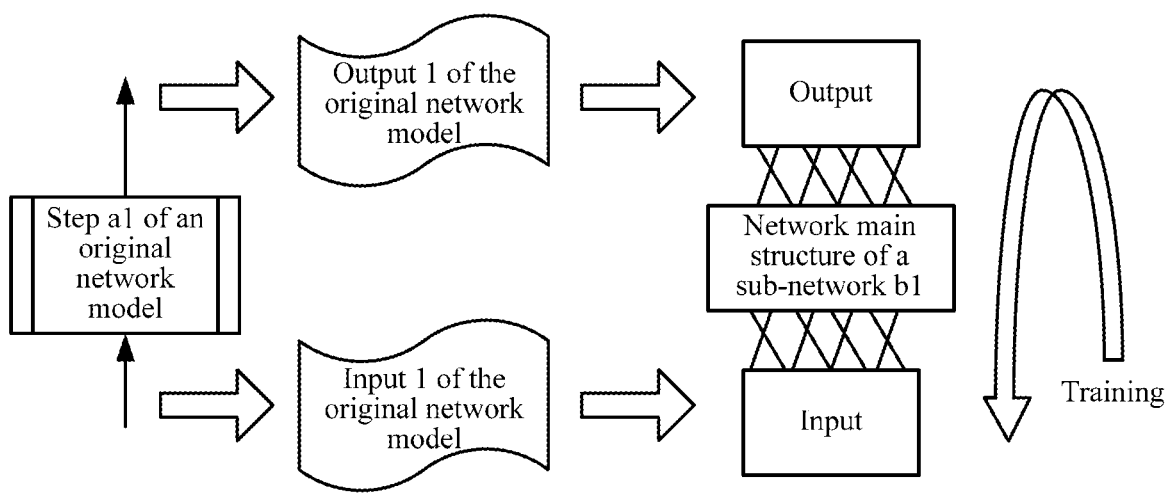
FIG. 3a is a schematic diagram of processes of building and performing optimization training on a sub-network b1 equivalent to a data processing step a1 in an original network model according to an embodiment of this application.

For step S204 to step S208, refer to FIG. 3a. FIG. 3a is a schematic diagram of processes of building and performing optimization training on the sub-network b1 equivalent to the data processing step a1 in the original network model.

S209: Select any sub-network from the at least one sub-network as a seed network.

S210: Select a sub-network other than the seed network from the at least one sub-network as a to-be-merged object network according to a preset merging sequence, where the merging sequence may be set according to data processing steps, and the preset merging sequence includes any one of the following: a performing sequence of the at least one data processing step, a reverse performing sequence of the at least one data processing step, and a sequence of structural similarity levels between the at least one sub-network.

In step S209 and step S210, according to the example described in this embodiment, the original network model performs four data processing steps: "step a1→step a2→step a3→step a4", and equivalent sub-networks are respectively the sub-network b1, the sub-network b2, a sub-network b3, and the sub-network b4. Assuming that the sub-network b2 is the seed network, (1) the sub-network b3 equivalent to step a3 is selected as the to-be-merged object network according to the performing sequence of the at least one data processing step; (2) if selection is performed according to a sequence reverse to the performing sequence of the at least one data processing step, the sub-network b1 equivalent to step a1 is selected as the to-be-merged object network; (3) if selection is performed according to the sequence of structural similarity levels between the at least one sub-network, a sub-network having a highest structural similarity with the sub-network b2 is selected as the to-be-merged object network. Assuming that network main structures of the sub-network b2 and the sub-network b4 are both a fully connected layer structure, the sub-network b4 is selected as the to-be-merged object network.

S211: Split an input layer and an output layer between the seed network and the to-be-merged object network.

According to a network the structure of the sub-network shown in FIG. 3a, an input layer and an output layer of the sub-network need to be both split in the step. If the seed network is used as an upper-layer sub-network, and the to-be-merged object network is used as a lower-layer sub-network, an input layer of the seed network and an output layer of the to-be-merged object network need to be both split. If the seed network is used as a lower-layer sub-network, and the to-be-merged object network is used as an upper-layer sub-network, an output layer of the seed network and an input layer of the to-be-merged object network need to be both split.

S212: Perform merging connection on the seed network and the to-be-merged object network in a fully connected manner; and if the merging connection succeeds, go to step S214; or if the merging connection fails, go to step S213.

The fully connected manner means that for pre-data A and target data B, it is set B=W×A. W is a weight matrix, and x indicates a matrix multiplication. In the step, it is set that the seed network is A and the to-be-merged object network is B. Each neuron used as an output in the seed network is mapped to a neuron used as an input in the to-be-merged object network by means of mapping of the specified weight matrix W, that is, a mapping relationship between each neuron used as an output in the seed network and each neuron used as an input in the to-be-merged object network is established. For example, in FIG. 3b, a mapping relationship between each neuron in the sub-network b1 and each neuron of the sub-network b2 is established in a fully connected manner by using a weight matrix, to establish a connection between the sub-network b1 and the sub-network b2.

S213: Add an intermediate hidden layer between the seed network and the to-be-merged object network, and perform merging connection on the seed network and the to-be-merged object network in a fully connected manner by using the intermediate hidden layer.

S214: Perform, with reference to at least one group of input/output data corresponding to a data processing step equivalent to the seed network and at least one group of input/output data corresponding to a data processing step equivalent to the to-be-merged object network, optimization adjustment on a parameter of a network obtained by means of merging connection.

In an embodiment of this application, the seed network and the to-be-merged object network may both be a sub-NN, and optimization adjustment may be performed on the sub-NN by using the input/output data determined in the step.

An input layer of the network obtained by means of merging connection is an input layer of a lower-layer sub-network, and an output layer of the network obtained by means of merging connection is an output layer of an upper-layer sub-network. Therefore, in the step, optimization adjustment needs to be performed, with reference to output data corresponding to a data processing step equivalent to the upper-layer sub-network and output data corresponding to a data processing step equivalent to the lower-layer sub-network, on the parameter of the network obtained by means of merging connection.

S215: Iterate the process of step S210 to step S214 by using the network obtained by means of merging connection as a seed network until merging connection is performed on all the at least one sub-network, to form a target network model.

In an embodiment of this application, step S210 to step S214 may be repeatedly performed. sub-networks corresponding to data processing steps in each data processing sub-procedure are sequentially merged according to the preset merging sequence, for example, according to a performing sequence of the data processing steps in each data processing sub-procedure, to obtain a merged sub-network. For example, sub-networks corresponding to data processing steps in the first data processing sub-procedure are merged to obtain a merged first sub-NN. Similarly, sub-networks corresponding to data processing steps in the second data processing sub-procedure are merged to obtain a merged second sub-NN, and sub-networks corresponding to data processing steps in the third data processing sub-procedure are merged to obtain a merged third sub-NN. Merging processing corresponding to the node 00 is performed on the merged first sub-NN, the merged second sub-NN, and the merged third sub-NN in the preset merging sequence, to obtain the target network model, for example, an NN model.

Figure 3B:
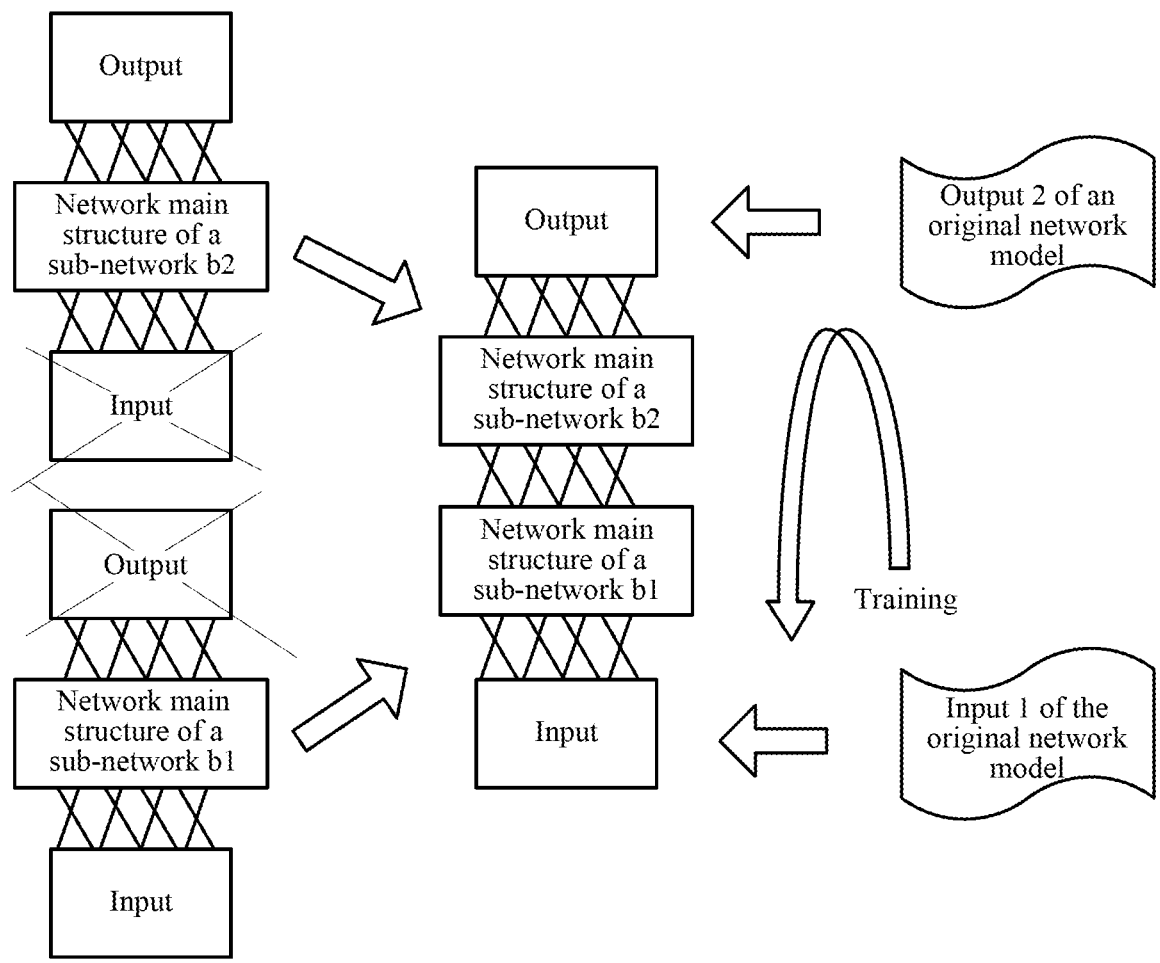
FIG. 3b is a schematic diagram of a process of merging a sub-network b1 and a sub-network b2 and a process of performing optimization training on a network obtained by means of merging connection according to an embodiment of this application.
Figure 3C:
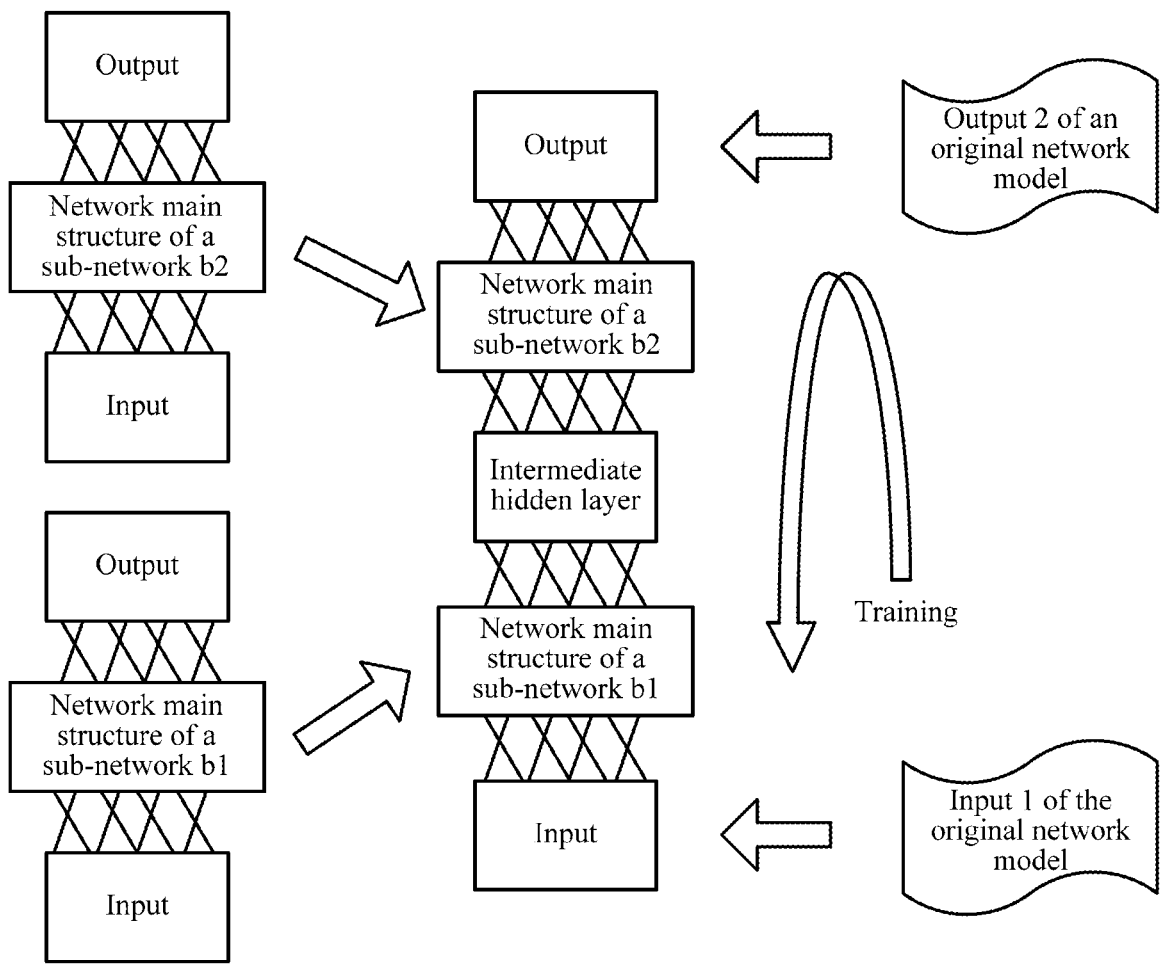
FIG. 3c is another schematic diagram of a process of merging a sub-network b1 and a sub-network b2 and a process of performing optimization training on a network obtained by means of merging connection according to an embodiment of this application.

Step S209 to step S215 in this embodiment may be specific detailed steps of step S104 shown in FIG. 1. For step S209 to step S215, refer to FIG. 3b and FIG. 3c. FIG. 3b and FIG. 3c are respectively a schematic diagram of a process of merging the sub-network b1 and the sub-network b2 and a schematic diagram of a process of performing optimization training on the network obtained by means of merging connection.

In an embodiment of this application, the intermediate hidden layer is used for adapting an output of a previous sub-network to an input of a next sub-network. For example, in FIG. 3b, if the format of an output of the sub-network b1 does not match the format of an input of the sub-network b2, the output of the sub-network b1 may be adjusted by means of processing of the intermediate hidden layer, so that the form of the output of the adjusted sub-network b1 matches the form of the input of the sub-network b2.

By means of the machine learning-based network model building method in this embodiment of this application, a data processing procedure of an original network model is analyzed, actual operating data generated by the original network model in the data processing procedure is used as a reference dataset, at least one equivalent sub-network is hierarchically built, optimization training is performed on the at least one sub-network, and a target network model is finally formed by means of merging. Layers of the target network model are flexibly and quickly built by using the actual operating data of the original network model and then are merged to form the target network model, and there is no need to design an entire structure of the target network model from the very beginning. Therefore, a model building process is simplified, and the model building efficiency is effectively improved. Optimization adjustment on the target network model is performed in a divided manner, optimization adjustment is first performed on each sub-network, and then the at least one sub-network is merged, so that an optimization adjustment process of the target network model is more flexible, and the model building efficiency is further improved.

Figure 4:
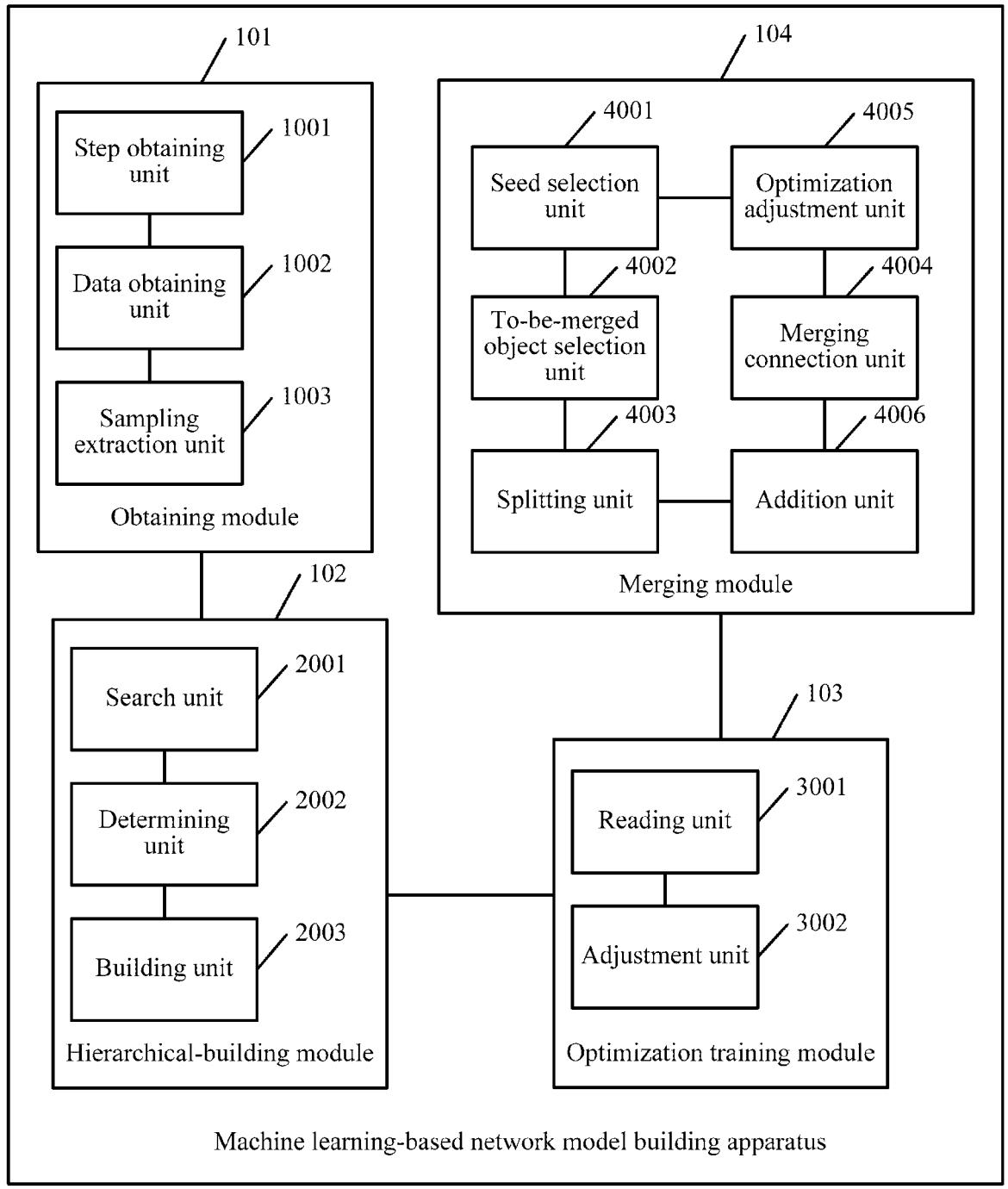
FIG. 4 is a schematic structural diagram of a machine learning-based network model building apparatus according to an embodiment of this application.

An embodiment of this application further discloses a machine learning-based network model building apparatus. Referring to FIG. 4, the apparatus may run the following units:

an obtaining module 101, configured to obtain a data processing procedure of an original network model and a reference dataset generated by the original network model in the data processing procedure;

a hierarchical-building module 102, configured to hierarchically build at least one sub-network according to the data processing procedure and the reference dataset;

an optimization training module 103, configured to perform optimization training on the at least one sub-network by using the reference dataset; and a merging module 104, configured to merge the at least one sub-network on which the optimization training has been performed, to form a target network model.

During one implementation, in a process of running the obtaining module 101, the apparatus specifically runs the following units:

a step obtaining unit 1001, configured to obtain at least one data processing step performed by the original network model in the data processing procedure;

a data obtaining unit 1002, configured to obtain operating data generated when the original network model performs each data processing step; and a sampling extraction unit 1003, configured to extract the reference dataset from the operating data generated when the original network model performs each data processing step, where the reference dataset includes at least one group of input/output data corresponding to each data processing step. In an example, the sampling extraction unit 1003 is configured to extract some or all data from the operating data generated when the original network model performs each data processing step, to form the reference dataset.

During one implementation, in a process of running the hierarchical-building module 102, the apparatus specifically runs the following units:

a search unit 2001, configured to search a preset equivalent correspondence table for a network main structure of a sub-network that is equivalent to each data processing step;

a determining unit 2002, configured to determine, according to the at least one group of input/output data corresponding to each data processing step, an input layer structure and an output layer structure of the sub-network that are equivalent to the data processing step; and a building unit 2003, configured to build, according to the network main structure, the input layer structure, and the output layer structure of the sub-network that are equivalent to each data processing step, the sub-network equivalent to the data processing step, where one sub-network is equivalent to one data processing step.

During one implementation, in a process of running the optimization training module 103, the apparatus specifically runs the following units:

a reading unit 3001, configured to sequentially read the at least one group of input/output data corresponding to each data processing step from the reference dataset; and an adjustment unit 3002, configured to perform optimization adjustment on a parameter of the sub-network equivalent to each data processing step with reference to the at least one group of input/output data corresponding to each data processing step and according to an NN training optimization algorithm, where the parameter includes: at least one of a network node, a weight, and a training rate.

During one implementation, in a process of running the merging module 104, the apparatus specifically runs the following units:

a seed selection unit 4001, configured to select any sub-network from the at least one sub-network as a seed network;

a to-be-merged object selection unit 4002, configured to: select a sub-network other than the seed network from the at least one sub-network as a to-be-merged object network according to a preset merging sequence, where the preset merging sequence includes any one of the following: a performing sequence of the at least one data processing step, a reverse performing sequence of the at least one data processing step, and a sequence of structural similarity levels between the at least one sub-network;

a splitting unit 4003, configured to split an input layer and an output layer between the seed network and the to-be-merged object network;

a merging connection unit 4004, configured to perform merging connection on the seed network and the to-be-merged object network in a fully connected manner; and an optimization adjustment unit 4005, configured to perform, with reference to at least one group of input/output data corresponding to a data processing step equivalent to the seed network and at least one group of input/output data corresponding to a data processing step equivalent to the to-be-merged object network if the merging connection succeeds, optimization adjustment on a parameter of a network obtained by means of merging connection.

The seed selection unit 4001 is further configured to iterate, by using the network obtained by means of merging connection as a seed network, corresponding processing performed by the to-be-merged object selection unit 4002, the splitting unit 4003, the merging connection unit 4004, and the optimization adjustment unit 4005 until merging connection is performed on all the at least one sub-network, to form the target network model.

In a process of running the merging module 104, the apparatus further runs the following unit:

an addition unit 4006, configured to add an intermediate hidden layer between the seed network and the to-be-merged object network if the merging connection fails, so that the merging connection unit 4004 performs merging connection on the seed network and the to-be-merged object network in a fully connected manner by using the intermediate hidden layer.

The apparatus shown in FIG. 4 can be configured to perform the steps in the method described in the embodiments of FIG. 1 to FIG. 3. Therefore, for functions of the units of the apparatus shown in FIG. 4, refer to the descriptions of the steps shown in FIG. 3, and details are not described herein again.

Similar to the method, by means of the machine learning-based network model building apparatus in this embodiment of this application, a data processing procedure of an original network model is analyzed, actual operating data generated by the original network model in the data processing procedure is used as a reference dataset, at least one equivalent sub-network is hierarchically built, optimization training is performed on the at least one sub-network, and a target network model is finally formed by means of merging. Layers of the target network model are flexibly and quickly built by using the actual operating data of the original network model and then are merged to form the target network model, and there is no need to design an entire structure of the target network model from the very beginning. Therefore, a model building process is simplified, and the model building efficiency is effectively improved. Optimization adjustment on the target network model is performed in a divided manner, optimization adjustment is first performed on each sub-network, and then the at least one sub-network is merged, so that an optimization adjustment process of the target network model is more flexible, and the model building efficiency is further improved.

A person of ordinary skill in the art may understand that all or some of the procedures of the methods in the embodiments may be implemented by a computer program instructing relevant hardware. The program may be stored in a computer-readable storage medium. When being executed, the program may include the procedures of the methods in the foregoing embodiments. The storage medium may be: a magnetic disk, an optical disc, a read-only memory (ROM), a random access Memory (RAM), or the like.

Figure 5:
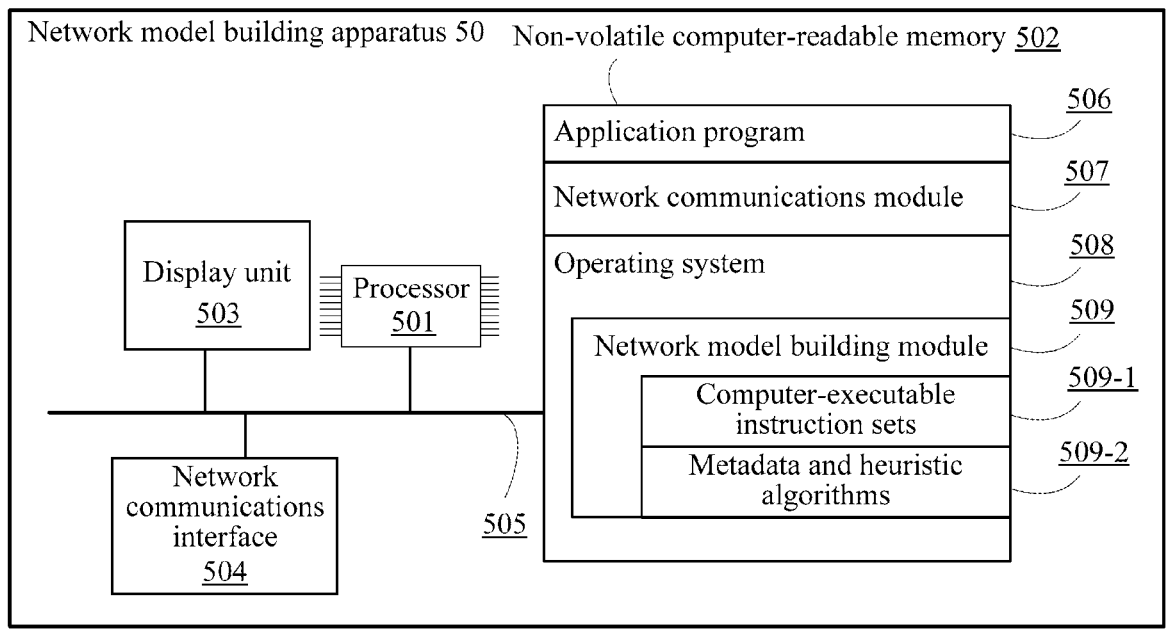
FIG. 5 is a schematic structural diagram of a machine learning-based network model building apparatus according to an embodiment of the present disclosure.

FIG. 5 is a schematic structural diagram of a machine learning-based network model building apparatus according to an embodiment of this application. As shown in FIG. 5, the network model building apparatus 50 may include: a processor 501, a non-volatile computer-readable memory 502, a display unit 503, and a network communications interface 504. These components perform communication through a bus 505.

In this embodiment, the memory 502 stores a plurality of program modules, including: an application program 506, a network communications module 507, and an operating system 508.

The processor 501 may read various modules (not shown in the figure) included in the application program in the memory 502 to perform various function applications and data processing of the network model building apparatus. There may be one or more processors 501 in this embodiment, and the processor 501 may be a CPU, a processing unit/module, an ASIC, a logical module, a programmable gate array, or the like.

The operating system 508 may be: a Windows operating system, a Linux operating system, or an Android operating system. The operating system 508 may include a network model building module 509. The network model building apparatus 509 may include computer-executable instruction sets 509-1 formed by the functional modules in the apparatus shown in FIG. 4 and corresponding metadata and heuristic algorithms 509-2. These computer-executable instruction sets may be executed by the processor 501 to complete the method shown in FIG. 1 or FIG. 2 or the functions of the apparatus shown in FIG. 4.

The application program 506 may include an application program installed and running in a terminal device.

In this embodiment, the network communications interface 504 cooperates with the network communications module 507 to complete receiving and sending of various network signals of the network model building apparatus 50.

The display unit 503 has a display panel, configured to complete input and displaying of relevant information.

In addition, the functional modules in the embodiments of this application may be integrated into one processing unit, or each of the modules may exist alone physically, or two or more modules may be integrated into one unit. The integrated unit may be implemented in the form of hardware, or may be implemented in the form of a software functional unit. The functional modules in the embodiments may be located in one terminal or at a network node, or may be distributed on a plurality of terminals or at a plurality of network nodes.

Therefore, this application further provides a storage medium, storing computer-readable instructions. The computer-readable instructions are executed by at least one processor to perform any method embodiment above.

What is disclosed above is exemplary embodiments of this application, and certainly is not intended to limit the protection scope of this application. Therefore, equivalent variations made in accordance with the claims of this application shall fall within the scope of this application.

What is claimed is:

1. A method for building a machine learning based network model, comprising:
   obtaining, by processing circuitry of an information processing apparatus, a data processing procedure of a first network model and a reference dataset that is generated by the first network model in the data processing procedure, the data processing procedure of the first network model including a plurality of data processing steps, the reference dataset including input and output data for each of the plurality of data processing steps;
   building, in a second network model with a data processing procedure that is different from the data processing procedure of the first network model, a first sub-network to perform a first data processing step of the plurality of data processing steps, the second network model being the machine learning based network model of a neural network type, the building the first sub-network including:
   determining a first main network structure for the first sub-network that performs the first data processing step by searching a preset equivalent correspondence table, the preset equivalent correspondence table associating, for each particular type of data processing step of a plurality of types of data processing steps, a corresponding main network structure type to be used for the particular type of data processing step,
   determining, according to the input and output data corresponding to the first data processing step of the first network model, a first input layer structure, and a first output layer structure of the first sub-network that performs the first data processing step, and
   building the first sub-network according to the determined first main network structure, the first input layer structure, and the first output layer structure;
   building, in the second network model, a second sub-network to perform a second data processing step of the plurality of data processing steps, the building the second sub-network including:
   determining a second main network structure for the second sub-network that performs the second data processing step of the first network model by searching the preset equivalent correspondence table,
   determining, according to the input and output data corresponding to the second data processing step of the first network model, a second input layer structure, and a second output layer structure of the second sub-network that performs the second data processing step, and
   building the second sub-network according to the determined second main network structure, the second input layer structure, and the second output layer structure; and
   performing optimization training on the first sub-network of the second network model by using the input and output data of the first data processing step that is included in the reference dataset and generated by the first network model, the input data of the first data processing step being used as an input of the first sub-network and the output data of the first data processing step being used as an output of the first sub-network in the optimization training of the first sub-network.

2. The method according to claim 1, wherein the data processing procedure of the first network model includes the first data processing step and the second data processing step that follows the first data processing step, and the method further comprises:
   performing optimization training on the second sub-network by using the input and output data of the second data processing step that is included in the reference dataset and generated by the first network model; and
   merging the first sub-network with the second sub-network into the second network model.

3. The method according to claim 2, further comprising:
   extracting the input and output data for the first data processing step;
   extracting the input and output data for the second data processing step; and
   including the input and output data for the first data processing step and the input and output data for the second data processing step in the reference dataset,
   wherein the plurality of types of data processing steps includes at least one of an undiversified machine learning step, a data statistics step, a sequence analysis step, a function processing step, or a data editing processing step.

4. The method according to claim 3, wherein the performing the optimization training on the first sub-network of the second network model further comprises:
   reading, from the reference dataset, the input and output data corresponding to the first data processing step of the first network model; and
   performing optimization adjustment on a parameter of the first sub-network of the second network model for performing the first data processing step based on the input and output data according to a neural network (NN) training optimization algorithm, wherein the parameter is at least one of a network node, a weight, and a training rate.

5. The method according to claim 3, wherein the performing the optimization training on the first sub-network of the second network model further comprises:
   reading, from the reference dataset, the input and output data corresponding to the first data processing step of the first network model; and
   performing optimization adjustment on a parameter of the first sub-network of the second network model for performing the first data processing step based on the input and output data corresponding to the first data processing step and according to a neural network (NN) training optimization algorithm, wherein the parameter is at least one of a network node, a weight, and a training rate.

6. The method according to claim 5, wherein the merging the first sub-network with the second sub-network into the second network model comprises:
selecting one of the first sub-network and the second sub-network as a seed network, and the other one of the first sub-network and the second sub-network as a to-be-merged network;
removing the second input layer structure and the first output layer structure between the seed network and the to-be-merged network;
merging the seed network with the to-be-merged network to form a grown seed network; and
performing, when the merging of the grown seed network succeeds, optimization adjustment on a parameter of the grown seed network based on the input and output data corresponding to the first data processing step and the input and output data corresponding to the second data processing step.

7. The method according to claim 6, further comprising:
adding an intermediate hidden layer structure between the seed network and the to-be- merged network when the merging fails; and
merging the seed network and the to-be-merged network using the intermediate hidden layer.

8. An apparatus, comprising:
processing circuitry configured to:
obtain a data processing procedure of a first network model and a reference dataset that is generated by the first network model in the data processing procedure, the data processing procedure of the first network model including a plurality of data processing steps, the reference dataset including input and output data for each of the plurality of data processing steps;
determine a first main network structure for a first sub-network, in a second network model of a neural network type and with a data processing procedure that is different from the data processing procedure of the first network model, that performs the first data processing step by searching a preset equivalent correspondence table, the preset equivalent correspondence table associating, for each particular type of data processing step of a plurality of types of data processing steps, a corresponding main network structure type to be used for the particular type of data processing step;
determine, according to the input and output data corresponding to the first data processing step of the first network model, a first input layer structure, and a first output layer structure of the first sub-network that performs the first data processing step;
build the first sub-network according to the determined first main network structure, the first input layer structure, and the first output layer structure;
determine a second main network structure for a second sub-network that performs a second data processing step of the plurality of data processing steps of the first network model by searching the preset equivalent correspondence table;
determine, according to the input and output data corresponding to the second data processing step of the first network model, a second input layer structure, and a second output layer structure of the second sub-network that performs the second data processing step;
build, in the second network model, the second sub-network according to the determined second main network structure, the second input layer structure, and the second output layer structure; and
perform optimization training on the first sub-network of the second network model by using the input and output data of the first data processing step that is included in the reference dataset and generated by the first network model, the input data of the first data processing step being used as an input of the first sub-network and the output data of the first data processing step being used as an output of the first sub-network in the optimization training of the first sub-network.

9. The apparatus according to claim 8, wherein the data processing procedure of the first network model includes the first data processing step and the second data processing step that follows the first data processing step, and the processing circuitry is further configured to:
perform optimization training on the second sub-network by using the input and output data of the second data processing step that is included in the reference dataset and generated by the first network model; and
merge the first sub-network with the second sub-network into the second network model.

10. The apparatus according to claim 9, wherein the processing circuitry is further configured to:
extract the input and output data for the first data processing step;
extract the input and output data for the second data processing step; and
include the input and output data for the first data processing step and the input and output data for the second data processing step in the reference dataset,
wherein the plurality of types of data processing steps includes at least one of an undiversified machine learning step, a data statistics step, a sequence analysis step, a function processing step, or a data editing processing step.

11. The apparatus according to claim 10, wherein the processing circuitry is further configured to:
read, from the reference dataset, the input and output data corresponding to the first data processing step of the first network model; and
perform optimization adjustment on a parameter of the first sub-network of the second network model for performing the first data processing step based on the input and output data and according to a neural network (NN) training optimization algorithm, wherein the parameter is at least one of a network node, a weight, and a training rate.

12. The apparatus according to claim 10, wherein the processing circuitry is further configured to:
read, from the reference dataset, the input and output data corresponding to the first data processing step of the first network model; and
perform optimization adjustment on a parameter of the first sub-network of the second network model for performing the first data processing step based on the input and output data corresponding to the first data processing step and according to a neural network (NN) training optimization algorithm, wherein the parameter is at least one of a network node, a weight, and a training rate.

13. The apparatus according to claim 12, wherein the processing circuitry is configured to:
- select one of the first sub-network and the second sub-network as a seed network, and the other one of the first sub-network and the second sub-network as a to-be-merged network;
- remove the second input layer structure and the first output layer structure between the seed network and the to-be-merged network;
- merge the seed network with the to-be-merged network to form a grown seed network; and
- perform, when the merging of the grown seed network succeeds, optimization adjustment on a parameter of the grown seed network based on the input and output data corresponding to the first data processing step and the input and output data corresponding to the second data processing step.

14. The apparatus according to claim 13, wherein the processing circuitry is configured to:
- add an intermediate hidden layer structure between the seed network and the to-be-merged network when the merging fails; and
- merge the seed network and the to-be-merged network using the intermediate hidden layer.

15. A non-transitory computer-readable medium storing instructions which when executed by a computer cause the computer to perform:
- obtaining a data processing procedure of a first network model and a reference dataset that is generated by the first network model in the data processing procedure, the data processing procedure of the first network model including a plurality of data processing steps, the reference dataset including input and output data for each of the plurality of data processing steps;
- building a first sub-network, in a second network model of a neural network type and with a data processing procedure that is different from the data processing procedure of the first network model, the first sub-network performing a first data processing step of the plurality of data processing steps, the building the first sub-network including:
  - determining a first main network structure for the first sub-network that performs the first data processing step by searching a preset equivalent correspondence table, the preset equivalent correspondence table associating, for each particular type of data processing step of a plurality of types of data processing steps, a corresponding main network structure type to be used for the particular type of data processing step,
  - determining, according to the input and output data corresponding to the first data processing step of the first network model, a first input layer structure, and a first output layer structure of the first sub-network that performs the first data processing step, and
  - building the first sub-network according to the determined first main network structure, the first input layer structure, and the first output layer structure;
- building, in the second network model, a sub-network to perform a second data processing step of the plurality of second data processing steps, the building the second sub- network including,
  - determining a second main network structure for the second sub-network that performs the second data processing step of the first network model by searching the preset equivalent correspondence table,
  - determining, according to the input and output data corresponding to the second data processing step of the first network model, a second input layer structure, and a second output layer structure of the second sub-network that performs the second data processing step, and
  - building the second sub-network, according to the determined second main network structure, the second input layer structure, and the second output layer structure; and
- performing optimization training on the first sub-network of the second network model by using the input and output data of the first data processing step that is included in the reference dataset and generated by the first network model, the input data of the first data processing step being used as an input of the first sub-network and the output data of the first data processing step being used as an output of the first sub-network in the optimization training of the first sub-network.

16. The non-transitory computer-readable medium according to claim 15, wherein the data processing procedure of the first network model includes the first data processing step and t second data processing step that follows the first data processing step, and the computer further performs:
- performing optimization training on the second sub-network by using the input and output data of the second data processing step that is included in the reference dataset and generated by the first network model; and
- merging the first sub-network with the second sub-network into the second network model.

17. The non-transitory computer-readable medium according to claim 16, wherein the computer performs:
- extracting the input and output data for the first data processing step;
- extracting the input and output data for the second data processing step; and
- including the input and output data for the first data processing step and the input and output data for the second data processing step in the reference dataset,
- wherein the plurality of types of data processing steps includes at least one of an undiversified machine learning step, a data statistics step, a sequence analysis step, a function processing step, or a data editing processing step.

18. The method according to claim 1, wherein a combination of the data processing steps in the data processing procedure of the first network model is different from a combination of data processing steps in the data processing procedure of the second network model.

19. The apparatus according to claim 8, wherein a combination of the data processing steps in the data processing procedure of the first network model is different from a combination of data processing steps in the data processing procedure of the second network model.

20. The non-transitory computer-readable medium according to claim 16, wherein a combination of the data processing steps in the data processing procedure of the first network model is different from a combination of data processing steps in the data processing procedure of the second network model.

* * * * *